United States Patent [19]

Petersen

[11] Patent Number: 4,498,940
[45] Date of Patent: Feb. 12, 1985

[54] PLATE GLASS REPAIR APPARATUS AND METHOD

[75] Inventor: Paul S. Petersen, Minnetonka, Minn.

[73] Assignee: Novus Inc., Minneapolis, Minn.

[21] Appl. No.: 528,728

[22] Filed: Sep. 1, 1983

[51] Int. Cl.³ .............................................. B32B 35/00
[52] U.S. Cl. .................................. 156/98; 30/164.95; 156/256; 156/514; 408/714
[58] Field of Search ........................ 30/164.95; 83/676; 125/20; 156/94, 98, 256, 513, 514; 248/362; 408/197, 714

[56] References Cited

U.S. PATENT DOCUMENTS

| | | | |
|---|---|---|---|
| 1,385,731 | 7/1921 | Taylor . | |
| 2,063,849 | 12/1936 | Peiler et al. | 49/14 |
| 2,140,901 | 12/1938 | Etzenhouser et al. | 125/20 |
| 2,143,744 | 1/1939 | Sohn | 41/35 |
| 2,478,846 | 8/1949 | Smith | 125/20 |
| 2,638,084 | 5/1953 | McLaughlin | 125/20 |
| 2,906,256 | 9/1959 | Glynn | 125/20 |
| 3,091,060 | 5/1963 | Giegerich et al. | 51/59 |
| 3,551,234 | 12/1970 | Britton | 156/98 |
| 3,742,793 | 7/1973 | Gray et al. | 83/8 |
| 3,800,643 | 4/1974 | Scott et al. | 83/100 |
| 3,986,913 | 10/1976 | Walz | 156/98 |
| 4,073,094 | 2/1978 | Walz | 51/111 |
| 4,194,322 | 3/1980 | Giardini | 51/81 |
| 4,208,229 | 6/1980 | Giardini | 156/94 |

OTHER PUBLICATIONS

Acceptable Methods, Techniques, and Practices Aircraft Inspection and Repair, Federal Aviation Administration 1972 No. AC 43.13-1A, pp. 17, 21-23, 74-79, 159-161.

*Primary Examiner*—Robert Dawson
*Attorney, Agent, or Firm*—Kinney & Lange

[57] ABSTRACT

A plate glass repair apparatus comprises a plate member that has an outer peripheral seal and can be held onto the surface of the plate glass to be repaired with vacuum generated from a self contained hand operated vacuum pump mounted on the plate. The plate is made so that the plate surface is forced down against the glass in locations sufficient to prevent the glass from being over stressed and for securely holding the tool in position. A cup like cutter for cutting a circular hole in the glass is positioned adjacent one corner of the plate and has a separate seal surrounding the cutter to form a chamber. Cutting fluid, such as water, is provided to flow from the outside of the cup like cutter toward the interior, where it is exhausted during the cutting operation. The cutter device for repairing plate glass is put into position over a break that is to be removed for plugging. Prior to cutting a backing plug is placed on the opposite face of the glass where the plug will be cut from the glass. The backing plug prevents the edges surrounding the opening from being chipped as the cutter breaks through. The backing plug is removed carefully and the cut out disc of glass will stay with the plug. A guide sleeve may be used to guide the disc of glass to prevent chipping of the edges of the opening. Subsequently a replacement glass disc is precisely ground to fit within the cut opening and is adhesively fastened into place.

14 Claims, 11 Drawing Figures

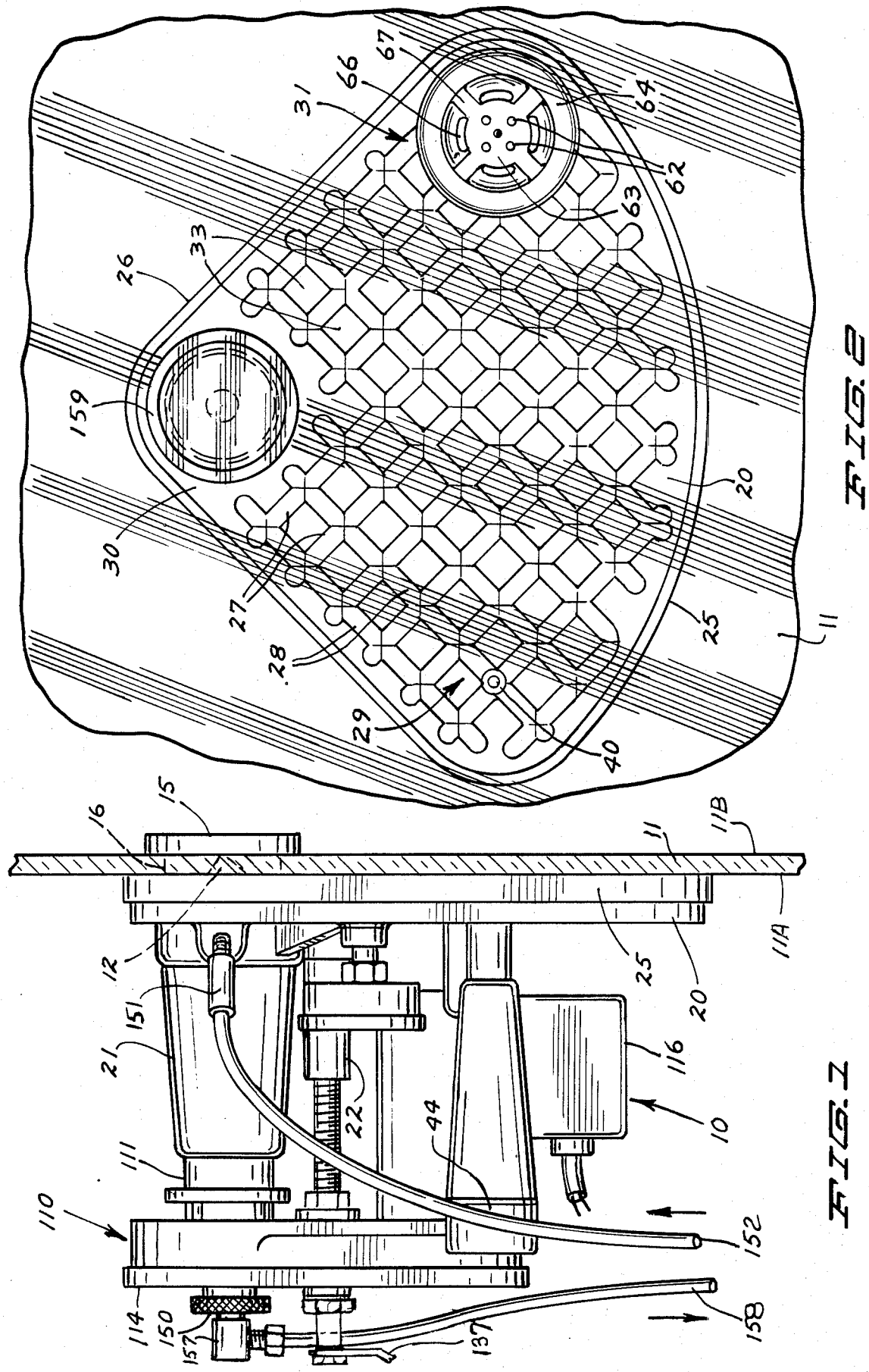

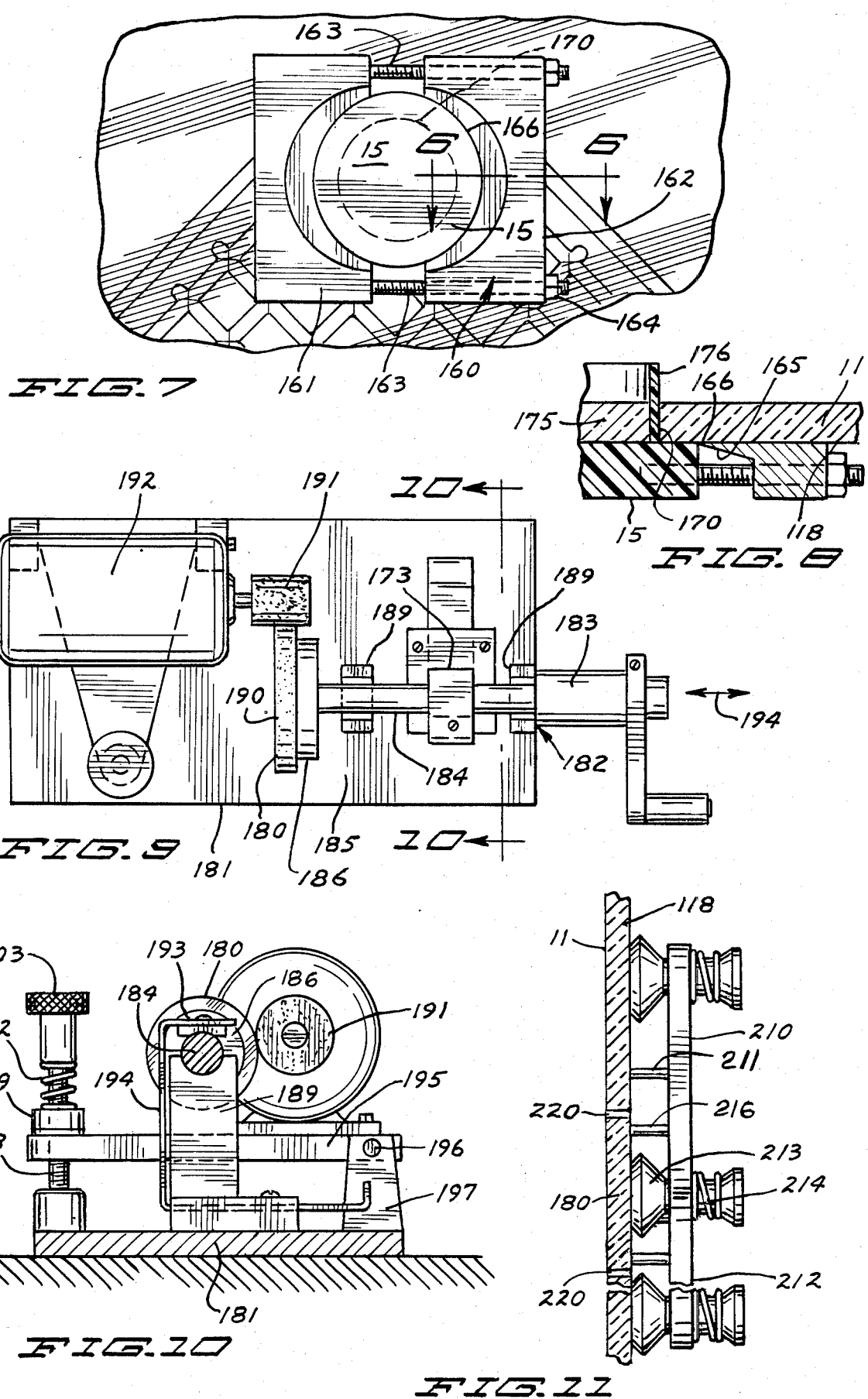

PLATE GLASS REPAIR APPARATUS AND METHOD

BACKGROUND OF THE INVENTION

1. Field of the Invention

The present invention relates to a plate glass repair apparatus and a method of performing such plate glass repair.

2. Description of the Prior Art

A method of repairing a pane of plate glass by drilling or cutting out a circular portion surrounding a crack in the pane and then gluing in a disc that has been cut from another piece of glass is disclosed in U.S. Pat. No. 3,986,913, issued Oct. 19, 1976 to Walz.

Prior devices have been advanced as well for repairing layers that had surface blemishes or cracks by putting in plugs to replace the area of layers surrounding the blemish. Such a method is shown in U.S. Pat. No. 2,143,744 to Sohn, and a similar repair method for repairing a glass layer in a vessel is shown in U.S. Pat. No. 3,551,234, issued to O. J. Britton. The damaged area is cut out and plugs are inserted in the cut outs in both of these patents. The plugs are held in place with suitable adhesive.

Cutters which will cut out discs of glass are shown in U.S. Pat. Nos. 4,073,094, also issued to Walz, and Pat. No. 4,208,229, issued to D. S. Giardini. These are exemplary of prior machines used for cutting circular openings in glass and require mounting members on both sides of the glass. In U.S. Pat. No. 4,073,094, a pilot hole is needed for securing the members together on the opposite sides of the painted glass to be cut.

U.S. Pat. No. 3,091,060 shows an ultrasonic machining method for drilling material out in a type of a plug; U.S. Pat. No. 2,638,084 shows a glass drilling machine that utilizes a coolant flow in a particular manner to aid in the cutting, as well as illustrating adjustable feed rates.

U.S. Pat. No. 2,906,256 is a cutter that has liquid cooling on the outside of the drill that is cutting, and a vacuum to reduce the likelihood of the breakage of the glass as the cut is made through the pane and to minimize the chipping during the break through of the cutter through the pane of glass.

U.S. Pat. No. 2,140,901 also shows a cutting device for cutting glass which is held on the pane of glass with suction cups while a cutting blade drills through the glass.

SUMMARY OF THE INVENTION

An apparatus for drilling a hole in a rigid sheet such as a plate glass sheet to be repaired, has a plate sealed at its edges and held onto the glass by creating a vacuum under the plate. Preferably the vacuum is created by a hand vacuum pump that can be operated from a handle used to initially manually support the plate in position. A "quill" or driven rotor is mounted on a support on the plate and is movable toward and away from the glass sheet through a provided opening in the plate. A glass cutter is provided at the end of the quill and the cutter engages the glass surface and cuts a disc from the glass. The disc is of size to surround a chip or crack or other damaged area of the glass that is to be repaired.

Before the cutting is to be commenced, in the process of operating the cutter, a backing plug is provided on the opposite side of the glass pane from the plate so that as the cutter passes through the glass it will not tend to chip or break away parts of the glass. The plug material will act as a support for the cut out portion.

A fluid flow is provided from outside of the cutter to the inside of the cutter and then to drain. This flow is relatively low volume, and can be provided from a self-contained, small pressurized container. The opening in the plate through which the cutter passes has a seal around it to keep the fluid isolated from the rest of the plate.

The vacuum can be released to release the plate from the glass pane when the cutting has been completed, and then the backing plug that is applied to the opposite side of the glass pane is removed as shown with a special tool.

A precut glass disc is sized to fit closely to the opening from the cut out disc and a suitable adhesive material that matches the index of refraction of the glass is used to cement the new disc into place in the cut opening. The new disc can be supported with a fixture for keeping the new disc perfectly coplanar with the surface of the glass.

After the adhesive has been cured, either through the use of ultraviolet light, or otherwise cured, the repair is complete.

The glass cutter apparatus is self-contained and the plate grips tightly onto the glass so that it doesn't move during the cutting operation. The plugging process is straight-forward, accurate and easily done.

BRIEF DESCRIPTION OF THE DRAWINGS

FIG. 1 is a side elevational view of a glass cutting apparatus made according to the present invention in position on a glass that is to have a portion repaired;

FIG. 2 is a bottom view of the device of FIG. 1 looking through the glass at a support plate;

FIG. 7 is a view showing a support plug being removed with a removal tool;

FIG. 8 is a sectional view taken as on line 8—8 in FIG. 7;

FIG. 9 is a top plan view of a tool for sizing glass plugs or discs which are to be inserted into the opening cut in the pane of glass;

FIG. 10 is a view taken as on line 10—10 in FIG. 9; and

FIG. 11 is a side view showing a positioning tool holding a replacement glass plug in position planar and flush with the outer surface of the pane of glass that is being repaired.

DETAILED DESCRIPTION OF THE PREFERRED EMBODIMENTS

Figure 3:
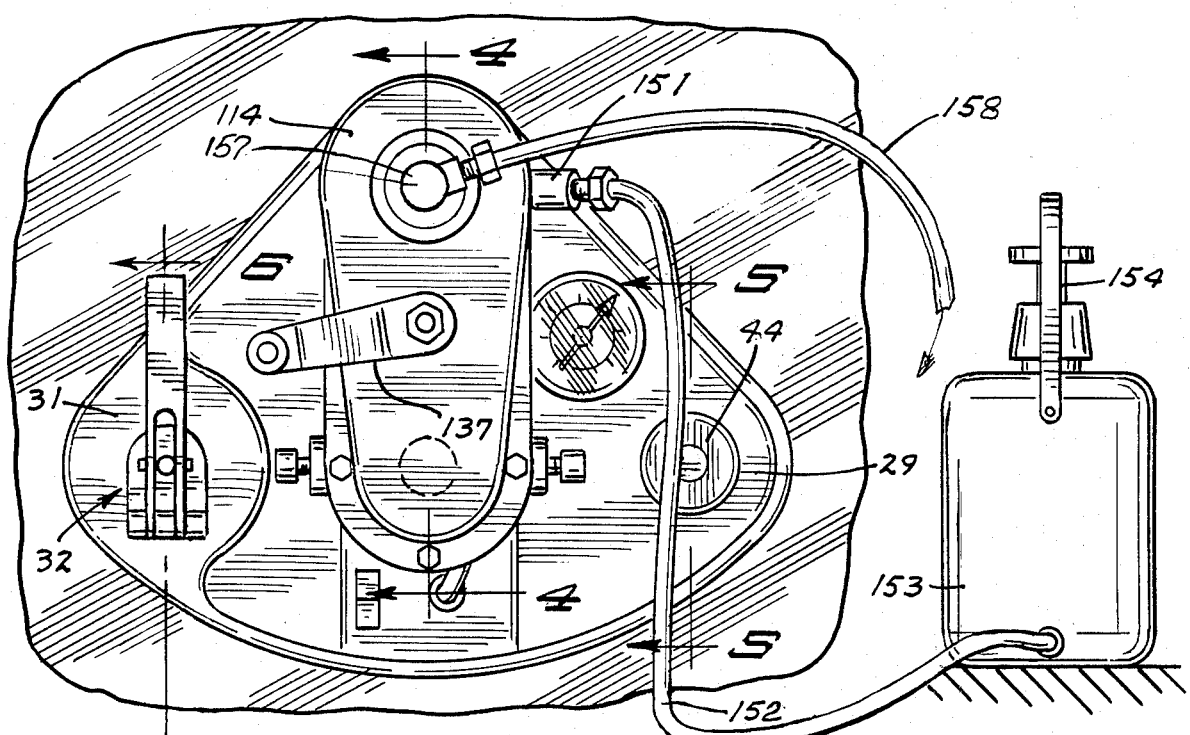
FIG. 3 is a top plan view of the device of FIG. 1 showing a supply of coolant adjacent to the machine.

A glass repair machine indicated generally at 10 is made for use in the process of repairing a break or crack in a sheet or pane of plate glass which is indicated at 11. A typical break is schematically shown at 12 and comprises a type of a cone shaped chip that may have been caused by a stone hitting the glass surface. In brief, the repair comprises cutting out a disc of the glass of sufficient size so that the glass will not shatter and the break will be in the cut out plug. The edges of the cut will be circular and continuous, and will not intersect the break. Then a separate glass disc that is separately cut or made can be ground to size very precisely to fit into the opening that is cut in the pane to be repaired. The new plug is cemented in place with a suitable adhesive that has an appropriate index of refraction.

Essential to the operation is to make sure that the edges of the cut opening are not chipped, are circular, and are smooth. As part of the process, the first step is to provide a backing plug indicated at 15 made up of a suitable material, such as plaster of paris, that is rigid, but is capable of being broken easily. In other words it is frangible material, but rigid and hard when subjected to compression forces. It does not have substantial resistance to shear or tension.

The backing plug 15 is of sufficient size to extend beyond the outer edges of the proposed cut which are indicated by dotted lines at 16 in FIG. 1. The plug 15 is premade and then held in place with a suitable adhesive layer against the glass. The adhesive layer is kept extremely thin, preferably in the range of one or two mils.

The cutting machine 10 is then placed on the opposite side of the pane of glass 11 against the surface 11A. The cutting machine includes a frame plate 20 which is a rigid cast member that includes a vertical cast hub 21, a control sleeve 22, and as will be explained fittings for handles and the like on the outer surface thereof. The under surface of plate 20, that is the surface next to the glass, is provided with suitable grooves along its peripheral edges for mounting a continuous flexible rubber seal 25, that is a perimeter seal that goes all the way around the plate.

As can be seen in FIG. 2 for example, the lower edge for the seal 25 provides a relatively narrow seal edge 26 that surround the plate. The plate 20 is generally shaped to resemble a sector of a circle, and has one corner portion 30 and has a long curved edge opposite the corner portion. The hub 21 is formed in the corner portion 30. The under surface of the plate 20 is provided with a plurality of grooves that are relatively shallow and as shown at 27 and 28 extend at right angles to each other to form a type of waffle pattern on the major portion of the under surface.

Figure 4:
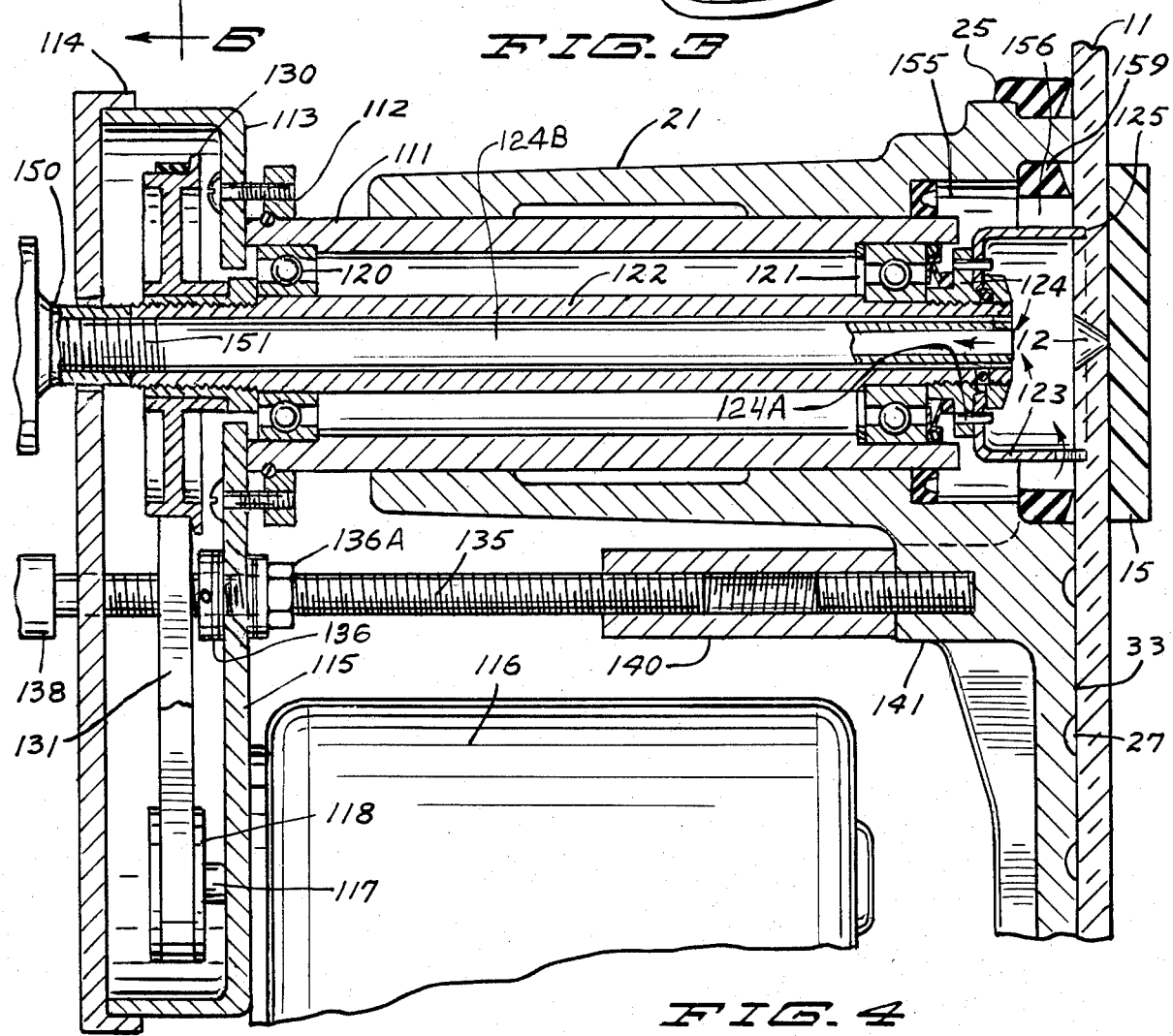
FIG. 4 is a sectional view taken as on line 4—4 in FIG. 3.
Figure 6:
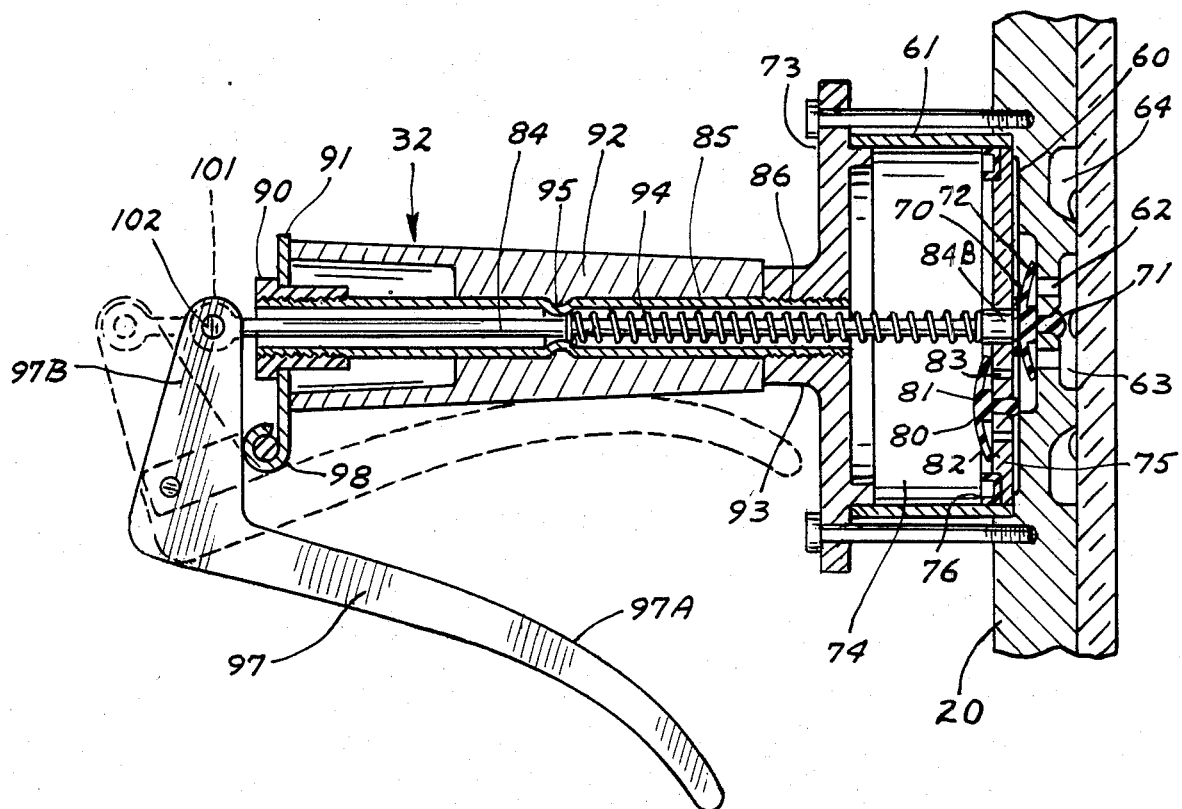
FIG. 6 is a sectional view taken as on line 6—6 in FIG. 3.

Corner portion 30 is the corner where the hub 21 is mounted. A second corner portion 31 is where a vacuum pump indicated generally at 32 in FIG. 6 is mounted, as will be explained, and a third corner portion 29 is where a handle including a vacuum release valve opens to the bottom of the plate 20. The edge 26 of the seal 25 is sufficiently narrow and flexible so that it will seat against the surface of the glass and permit a vacuum to be created within the perimeter of the seal and within the shallow grooves 27 and 28, while the sections of the plate between the grooves which are indicated at 33, as well as the other surface sections surrounding the openings in the corner portions of the plate, bear directly against the glass to support the glass and prevent it from being fractured by air pressure on the opposite side of the glass. In FIG. 4, for example, the depth of the grooves 27 is shown in cross section, and the intermediate portions 33 are also shown as bearing directly against the glass surface. Thus, a first step after the plug 15 has been mounted in place on the pane of glass 11B, is to place the cutting machine 10 onto the surface 11A of the glass and make sure that the seal 25 and in particular the seal edge 26 seats against the surface of the glass quite tightly with the portions of the plate indicated at 33 bearing against the glass. At that time, the underside of the plate, within the perimeter of the seal 25, is subjected to a vacuum.

Figure 5:
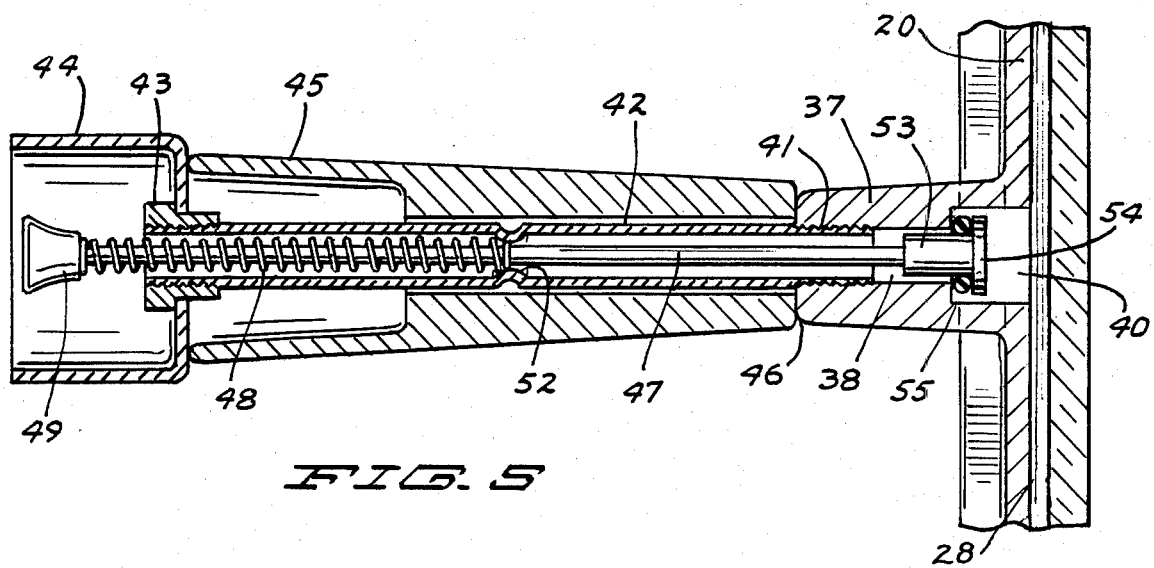
FIG. 5 is a sectional view taken as on line 5—5 in FIG. 3.

The plate 20 is provided with a pair of grip handles that are mounted to the outer side of the plate 20 in suitable collars that are formed directly on the plate. For example, in FIG. 5 the plate 20 has a collar 37 that is provided with a center opening 38 that opens to the under surface of the plate 20. As can be seen, the opening 38 has a valve opening portion 40 that is of larger diameter than the other parts of opening 38. The opening 38 is threaded as at 41 and receives a threaded tube 42, which tube in turn has a collar 43 threaded thereon at its outer end. The collar bears against a cup 44 that is then forced against a handle member 45 so that the handle member 45 abuts the housing 37 as at the line 46, and when the tube 42 is tightened down the handle member 45 is clamped tightly against the upper part of the plate and in particular onto the column 37.

The collar 43 is actually a nut type fitting that is threaded onto the outer part of the tube 42, and has a shoulder that bears against the inner surface of the cup 44. On the interior of the tube 42 a rod 47 is slidably mounted and is surrounded at the outer portions thereof by a spring 48. The rod 47 has a pushbutton 49 on the interior of the cup 44, and the spring 48 reacts against provided lugs 52 on the interior of the tube 42 to tend to urge the rod 47 in direction away from the plate 20.

The opposite end of the rod 47 has a valve member 53 mounted thereon. The valve member 53 has a valve head 54 that has an O ring 55 therein. The O ring 55 and valve head 54 fit within the opening 40, and the spring 48 tends to urge the O ring 55 up against the shoulder surface formed in the opening 40 where it joins the opening 38 to seal opening 38 with respect to opening 40. Opening 40 opens to the inner surface of the plate 20 within the perimeter of the seal 25. The handle 45 is easily gripped, and it can be seen in FIG. 3 that when the machine is being placed on the glass the handle member 45 can be gripped with the right hand for lifting the cutting machine.

The vacuum pump assembly 32, which was previously mentioned, is positioned on the opposite corner 31 of the plate 20 and also incorporates a grip handle as shown in FIG. 6. The vacuum pump is mounted in a recess indicated at 60 on the outer surface of the plate 20, and the recess 60 is of size to hold a vacuum pump housing 61 in position.

The recess 60 also opens through a plurality of openings 62 to a recess 63 in the under surface of the plate 20. Recess 63 is surrounded by an annular recess 64 (see also FIG. 2) that is separated from the recess 63 by downwardly extending projections 66 that define grooves 67 which extend between the recess 63 and the annular groove or recess 64.

In the center of the recess 63 there is a valve mounting opening in which a flexible valve member 70 is mounted. The valve 70 has an integral tang member 71 that fits into this opening to retain the valve 70 in place. The valve has a flexible outer annular cap or lip portion 72 which covers all the openings 62, as shown. The cap is flexible enough so that under differentials in pressure it will either move away from the openings 62 or will seal the openings to prevent flow in a particular direction. In effect this is a one way check valve member used in the vacuum pump.

The vacuum pump housing 61, when installed, seals against the recess 60 and has a cover member 73 mounted thereon to form an enclosed chamber 74. A piston 75 is slidably mounted in this chamber and the bottom side of the piston member as shown is open to the recess 60 and thus is open to the check valve 70. The piston has a seal 76 that seals on the interior of the housing 61 as the piston moves up. A check valve 80 is formed on the piston member and held in place with a suitable tang 81. The valve 80 has outwardly extending cap portions 82 which overlie openings indicated at 83 through the piston member. This permits air to escape from the chamber below the piston as the piston moves back toward plate 20 after it has been moved outwardly.

The piston 75 in turn is connected to a piston actuator rod 84 through a suitable fitting 84A. The rod 84 extends up through a guide tube 85 which is fixedly attached to the cover 73 through a threaded connection indicated at 86. The tube 85 in turn has a nut 90 at the upper end thereof that is threaded onto the exterior of the tube 85 as shown and which bears against a cap 91 which in turn bears against the upper edge of a handle grip 92 that is compressed against a collar 93 on the cover 73. By tightening the nut 90, the handle member 92 is clamped between the hub 93 and the cap 91 to be firmly held in place. The vacuum pump housing 61 is securely attached to the plate 20 so the handle member 92 then acts as a grip handle that can be held in one hand with handle member 45 in the other hand for lifting the plate 20.

On the interior of the tube 85, at the lower end thereof, there is a spring 94 which surrounds the piston actuating rod 84 and bears against a indented retainer 95. The spring also bears against the fitting 84A that holds the rod 84 in place on the piston, so that the spring load on the piston 75 is toward position shown in FIG. 6. The piston rod 84 is actuated through a hand lever or handle 97. The lever 97 is pivotally mounted as at 98 to a provided portion of the cap 95 that extends laterally from the hndle member 92. The handle 97 has a hand grip portion indicated at 97A, and an actuator portion indicated at 97B that overlies the tube 85. The outwardly extending actuator portion 97B connects to an eye member 101 on the end of the rod 84 through the use of a pin 102.

Thus, in operation, the handle member 97 can be hand operated by an operator at the same time that the operator grips the handle member 92. The handle is squeezed to its dotted line position, which will raise the rod 84, and consequently raise the piston member 75 as well. When this is done, the check valve 80 and the flexible portions 82 thereof will close the openings 83, and air will be drawn into the openings 62 because the flexible portions 72 of the check valve 70 will open to permit air to flow up into the chamber 74.

When the handle 97 is released the spring 94 will cause the piston 75 to return to its solid line position. The check valve 70, and its flexible portions 71 will close the openings 62 to prevent backflow of air in the area underneath the plate. The check valve 80 and its flexible portions 82 will open to permit air to flow back into the piston chamber 74. By two or three (or more) pumpings with the handle, a vacuum can be created in the recess 63, the annular recess 64, and through recess 64 to the grooves 27 and 28, so that a vacuum is created on the interior of the seal 25 and the plate is forced by air pressure on its outer surface down against the glass and held onto the surface 11A through the vacuum created within the seal 25.

Thus the cutting machine for cutting the plug or disc out of the glass to be repaired is easily handled with two hands gripping the formed handle portions, and placed up into proper position with the end portion 30 overlying the break, and the plaster plug 15. Then the pumping the handle member 97 a vacuum is created to hold the cutter machine very tightly against the glass surface. This also can be enhanced if desired by using a vacuum cup sealant on the edges 26 of the seal 25, but the securely held unit is then mounted in place for operation.

In order to cut a disc out of the glass, a cutter assembly is indicated generally at 110, and is substantially a self-contained unit that slides along the sleeve 21. The cutter assembly 110 includes a tubular guide sleeve 111, as perhaps best seen in FIG. 4, that is of size to fit within the hub 21, and slidably move therein. This is quite a close sliding fit, but the sleeve 111 can easily slide along the axis of the hub 21. The sleeve 111 has a collar 112 fixed thereto is supported on a housing 113 by use of clamping screws as shown. As shown the housing 113 forms a laterally extending housing. There is a cover 114 over housing 113 to form an interior chamber. The laterally extending portion 115 of the housing 113 extends laterally from the column 21 that houses the sleeve 111. The laterally extending portion 115 is used for mounting an electrical motor 116. The drive shaft 117 of the motor 116 extends into the interior chamber in housing 113 and has a pulley 118 mounted thereon, which in turn is used for driving the cutter.

The sleeve 111 has internal bearings 120 and 121 mounted at opposite ends thereof, and the bearings in turn rotatably mount a tubular drive shaft 122. The shaft 122 as shown is shouldered so that it is held axially by the bearings which in turn are held in place in the sleeve 111. The end of the shaft 122 adjacent to the pane of glass 11 is provided with a mounting head 124 that is used for drivably mounting a glass cutter 123. The cutter 123 is a cup shaped cutter driven by hub 124 through drive pins 124A. the cutter is held in place on the head by a draw tube 124B that has a head on the inside of the cutter and which is retained in place with a fitting 150 that acts as a nut and tightens down on exterior threads of draw tube 124B. The fitting 150 has an internal opening as well for permitting water flow through the interior of draw tube 124B. The head of the draw tube may have an "O" ring seal between it and member 124 to prevent leakage. The outer edge 125 of the cup shaped cutter 123 can have diamond grit thereon or other suitable material that is used for cutting glass when the shaft 122 is rotated and the cutter engages the glass surface.

The opposite end of the shaft 122 extends into the chamber formed by the housing 113 and cover 114, and has a pulley 130 drivably mounted thereon. As shown this is also threaded in place but it can be mounted in any suitable manner. The pulley 130 is driven by a belt 131 from the pulley 118 of motor 116.

The housing 113 has a feed adjustment stud 135 passing therethrough, actually in the center between the two lengths of the belt 131. This adjustment stud 135 is mounted on the lower wall of housing 113 by a collar 136 on the top and a nut 136A on the bottom. Thrust bearings are positioned between the surfaces of the lower wall and the collar and nut, respectively. A handle 137 (see FIG. 3) is drivably mounted on the upper end of the stud. The stud 135 is thus independently rotatably mounted on the housing 113 and can be rotated as desired. A threaded end of the stud 135 is threaded into a collar 140 that in turn is fixed onto a support boss 141 through the use of any suitable type coupling arrangement. As shown a short stud is threaded to the collar 140 and used for connecting the collar to the boss 141 on plate 20.

It can be seen that the collar 140 has a sufficient length of interior thread so that the stud 135 can be threaded in and out, which will in turn cause the housing 113 and thus the sleeve 111 to slide in and out along the hub 21. This will cause the shaft 122 and cutter 125 to also be moved as guided by the cranking of the handle 137.

In order to provide a flow of coolant for the cutter 123 when it is powered by the motor 116 when it is rotating, a fluid fitting 151 is mounted on housing 21 just to the outside of cutter 123 and opens to a sealed chamber 155 surrounding the cutter. Fitting 151 is connected through a suitable tube 152 to a small pressurized container 153. This container contains water or other suitable coolant liquid, and has a hand operated pump 154 that will provide an interior pressure in the container 153 and cause water or other fluid under pressure to be forced through the tube 152 into the chamber 155. The container 153 can be an ordinary home garden type sprayer container that has an internal pump for forcing material out, and can include in the fitting a suitable orifice to control the amount of fluid that comes through the fitting 151, into the chamber 155. The fluid (water) from tank 153 will move into the cutter around the edges of the cutter cup through provided scallops or openings in the cup edges.

The sealed chamber 155 is formed in a lower surface of the base plate 20. Chamber 155 surrounds the cutter 123 and provides space for operation. Note that an opening indicated at 156 opens from this chamber 155 out through the bottom of the plate 21, and this opening in turn permits the cutter to be moved in and out during cutting, and also is of size so that different size cutters from that shown at 123 can be utilized. A seal 159 mounted on the plate 20 surrounds the cutter and seals against the glass surface and keeps the chamber 155 sealed to prevent flow of coolant outside of the chamber 155 and also to permit the vacuum to be formed on the main sections of the plate 20 for holding it into the glass.

The fluid then flows from the interior of the cutter through draw tube 124B and through fitting 150. A conventional swivel coupling 157 connects to the draw tube 124B, and a flexible tube 158 carries the cooling water away from the work area.

The amount of flow of cooling fluid is quite low, and the amount in the container 153 is adequate for ordinary cutting jobs.

After the cutter has been operated, and the quill moved in so that the cutter 123 cuts through the glass (it shows partially through in FIG. 4) the edges 125 of the cutter will enter into the backing plug 15, and because the plug 15 backs the glass there will be little, if any, tendency to break or chip around the exit edges of the cut.

Once the cut has been made, the cutter is withdrawn. The cutting machine may be removed from the glass by releasing the vacuum by pushing button 49. There will be a cut glass disc which contains the chip or damaged area still in place on backing plug 15, but separated from the glass pane 11.

The backup plug can then be removed, and the rest of the steps in repairing the glass can be continued. As shown in FIGS. 7 and 8, a guillotine type cutter 160 may be used for removing plug 15. The cutter 160 has a first or base section 161, and a second relatively movable section 162, which are connected together through the bolts 163. The bolts 163 are connected to the section 161 and pass through openings in the section 162. By loosening the nuts 164, the sections 161 and 162 can be separated so that the sections, which are recessed to form an interior central opening, can be placed over the plug 15 as shown in FIG. 7. As seen in FIG. 8, each of the sections has a part circular cutting edge 166 formed by a recess indicated at 165. The cutting edge 166 is quite sharp, and the flat back surface of the sections 161 and 162 can be placed against the glass pane 11 after the cut indicated at 170 has been made all the way through the glass so that there is a circular glass disc 175 that has been cut loose from the pane of glass 11. Upon tightening the nuts 164, the cutting edges 166 will tend to slide under the plug 15 and will remove it substantially entirely from the glass.

If desired, in order to guide the cut out glass disc 175 effectively, a sleeve of suitable thickness material and of suitable strength indicated at 176 can be slid into the cut 170, and this will tend to hold the glass plug 175 from cocking and tending to chip the edges of the hole that has been formed in the glass pane 11. This sleeve 176 can be made out of cardboard or plastic, or similar materials.

After the backing plug 15 has been removed, any remaining material from plug 15 may be removed in a conventional manner to clean up the surface 11B of the glass pane. The next step in the process is to fit a new glass disc to the cut hole. This can be done by measuring the hole in the glass with conventional instruments, and selecting a suitable size disc from a supply of premade glass discs. One such disc is shown at 180 in FIG. 9. The disc 180 is held in place on a grinder-sizer assembly 181, so that its outside diameter can be sized precisely. The disc 180 is held onto a hand rotated support 182 that comprises a crank assembly 183 operable to rotate a rotatable shaft 184 that is positioned parallel to a base plate 185. The disc 180 can be adhesively affixed to a support 186. The shaft 184 is supported on recesses on the upper ends of a pair of support posts 189 and the shaft 184 can be rotated and also moved axially under manual control. The disc 180 is moved until the outer edge thereof is in lateral alignment with an abrasive drum 191 mounted on the output shaft of a small electric motor 192.

The shaft 184 is rotated on the support posts 189 and held in place on the recesses on the top of the posts 189 through the use of a spring loaded pad 193 that operates through a leaf spring 194 to resiliently urge the shaft 184 against its receptacle. This will permit the crank member 183 to be operated, and at the same time the crank 183 is being rotated it can be slid back and forth along the axis of the shaft 184 in directions as indicated by the arrow 194.

It should be noted that the grinding drum 191 has axial length as well, and the shaft of the motor 192 is parallel to the axis of the shaft 184.

The motor 192 is mounted on a plate 195 which is pivoted as at 196 to a support 197 on the base plate 181. The plate 195 extends substantially parallel to the base plate and is held in position about the pivot 196 through the use of a spring loaded adjustment screw indicated at 198. The screw 198 threads into a hub 199, and is spring loaded with a spring 202 so that a small spring load is placed on the threads and the adjustment can be retained even when the motor is running. The screw 198 has a hand wheel or nut 203 at its upper end for easy operation.

Once the disc 180 is in place, the adjustments can be made so that the drum 191 just barely touches the edge 190 of the disc 180. The motor 192 is started and the edge 190 will be abraded until it fits in the opening properly. The drum 191 has a very fine grit that will grind glass. Water can be applied during the grinding of the disc. From time to time the diameter of the disc 180 is measured to make sure that it will fit into the opening formed by the cut 170 in the glass pane 11, with a very few thousands clearance around the disc. Because the crank 181 can be rotated and at the same time slid axially, a smooth straight surface can be formed on the outer edge of the disc for a custom fit for the opening cut by the particular cutter being used. The custom fitting will accommodate for cutter wear or irregularities. This showing is exemplary only and the sizing can be done with different apparatus.

Then the final step is to take the disc 180 that has been properly sized, and as shown in FIG. 11, fit disc 180 within the opening in the pane of glass. The disc is held in place with a suitable fixture 210. The fixture 210 is of the type shown in United States Patent Application Ser. No. 472,043, filed Mar. 4, 1983, for Positioning Tool For Positioning Plugs In Rigid Devices For Repair. The fixture 210 assures that the disc 180 is held parallel to the pane 11 and flush with the surfaces of the pane. A set of support studs 211 are mounted to a support 212. The support is a "spider" with three legs. There is one stud 211 in each leg and while only one leg of support 212 is shown in full elevational view, each leg of the support carries one stud 211. The studs 211 bear against the surface of the pane of glass 11 and the support is held on the glass pane with suction cups 212. The properly sized disc 180 is held with a suction cup 213 mounted on a shank that is spring loaded with a spring 214 in direction away from the glass 11. An additional set of studs 216 (one on each leg of support 212) is used to support the disc 180 at three points. The studs 216 are at a lesser radius from the center of the support than studs 211. The studs 211 and 216 can be ground so that their ends rest precisely on the same plane and the disc 180 will be held true, parallel, and flush with the surface 11A of the pane 11. The theory of operation of the fixture 210 is fully explained in the application identified above. The fixture properly positions the disc 180 in the opening in the glass.

A suitable adhesive or cement is used for filling the gap between the disc 180 and the edges of the hole 171 which gap is indicated at 220. Gap 220 is shown as being quite wide in the drawings for illustrative purposes, but will be kept quite small. The adhesive will be selected to have an index of refraction that is compatible with the glass being used.

The steps for repairing a break in a pane of glass thus comprise cutting out a disc from the pane of sufficient size so the break is contained in the disc. As part of the cutting step a backing for the cut is provided on the opposite side of the pane of glass from the cutter. The cut out disc is removed, leaving an opening. A precut glass disc is then sized to fit the opening in the pane of glass with only a few thousands clearance as a maximum. The edges of the replacement disc is then coated with a suitable cement, such as a resin and held in place in the opening while the cement or adhesive cures.

What is claimed is:

1. An apparatus for cutting a hole in a rigid sheet such as a glass pane to be repaired, comprising a plate, means forming a plurality of intersecting grooves in a first surface of said plate, first perimeter seal means defining an area of said plate surrounding said grooves and defining a plane, vacuum pump means mounted on said plate and operable to evacuate the area within the first seal means, to thereby hold the plate against a surface of glass to be repaired, a cutter member mounted on said plate for movement generally normal to the plane defined by the first seal means and operable to pass through such plate to engage a pane of glass on which the plate is supported, second seal means surrounding said cutter member and defining a chamber of larger size than the cutter member fluidly isolated from the rest of the area within the first perimeter seal means, and fluid pressure means to provide a flow of fluid across the edges of the cutter to exhaust passage means to provide for a flow of fluid across the cutter member during cutting operations.

2. The apparatus as defined in claim 1 and a support tubular shaft for rotatably supporting said cutter member, a guide sleeve on said plate for guiding said support tubular shaft for movement generally normal to said plane defined by said first seal means, a motor support mounted directly on said support tubular shaft and movable therewith for movement along the guide sleeve toward and away from the plane defined by the first seal means, a drive motor mounted on the motor support, means to drivably connect the motor to drive the cutter member, and means to move the support tubular shaft along the sleeve during cutting operations.

3. The apparatus of claim 2 wherein said means to move the support tubular shaft comprises a screw threaded member that is manually operable to precisely move the cutter in direction normal to the plane defined by the first seal means as the cutter member is being rotated.

4. The apparatus of claim 1 wherein said plate is generally triangular in shape, and wherein the cutter member is mounted adjacent one of the corners formed by the plate.

5. The apparatus of claim 1 wherein said first perimeter seal means is of sufficient resilience to permit the first surface of the plate in which the grooves are formed to be in substantial contact with a rigid sheet on which the plate is mounted across the first surface of the plate when the defined area is under vacuum.

6. The apparatus of claim 3 wherein said support tubular shaft and motor assembly are removable from said sleeve.

7. The apparatus of claim 1 and at least a pair of handles mounted on the surface of said plate opposite from the first surface in which the grooves are formed, one of said handles comprising a vacuum pump assembly opening through the plate to the area defined by the first perimeter seal, a lever mounted on the one handle for actuating the vacuum pump, so that the plate can be positioned on a sheet with two hands of an operator holding the handles and one hand simultaneously operating the lever to create a vacuum in the chamber defined by the first perimeter seal.

8. The apparatus of claim 7 wherein the other handle member comprises a normally closed valve opening through said plate to the area defined by said first perimeter seal, and an exterior actuator button carried by the said valve to permit releasing vacuum from the area defined by said first perimeter seal while the other handle is being gripped by an operator.

9. An apparatus for forming a circular hole in a glass pane comprising a plate having a face forming a plane, means forming a plurality of intersecting grooves in said face of said plate, a perimeter seal member mounted on the edges of said plate and defining an enclosed area of said plate surrounding said grooves, a guide sleeve mounted on said plate having a central axis normal to said plate and extending away from the face, a bore formed in said sleeve, a first tubular shaft slidably mounted in said guide sleeve, a drive shaft rotatably mounted on the interior of said first tubular shaft, said plate having an opening therethrough aligned with the bore, a glass cutter mounted on said drive shaft and being movable through the opening to engage a pane of glass on which the plate is mounted, a motor support mounted on said first tubular shaft and movable therewith, a motor mounted on said motor support, a drive connection between said motor and drive shaft, vacuum pump means supported on said plate and operable to evacuate the area within the perimeter seal member, and second seal means surrounding said opening in said plate to fluidly isolate the opening from the rest of the area defined by the perimeter seal when the plate is in place on a pane of glass to thereby permit partial vacuum to be created in the area defined by the perimeter seal to hold the plate onto a glass pane.

10. The apparatus as defined in claim 9 and threadable means to move the tubular shaft and motor along the sleeve during cutting operations.

11. A method of repairing a crack in a pane of glass which comprises placing a substantially rigid plug on a first surface of said pane adjacent the crack area and of sufficient size to extend outwardly beyond the crack area a desired amount, securing said rigid plug on the surface of the glass, mounting a cutter member on an opposite surface of the pane of glass, cutting an annular slit through the pane of a diameter sufficient to form a glass plug which surrounds the crack but is of diameter less than the perimeter size of said rigid plug from the opposite side only, removing the cutting member, removing the rigid plug from the surface of the pane of glass and removing the glass plug, forming a cylindrical glass disc of only slightly smaller size than the hole left by the cutter, and affixing the glass disc into position in the opening in the pane of glass.

12. The method of claim 11 further comprising the step of using the cup shape cutter to penetrate through the pane of glass and into the rigid plug a short distance and retracting the cutter from the pane of glass.

13. The method of claim 11 wherein the forming step includes mounting a preformed glass disc in a fixture and grinding the exterior peripheral surface of the glass disc to a precise dimension matching the hole in the pane of glass.

14. The method of claim 11 including the steps of placing the glass disc on a holder member that has means to urge the surface of the plug against a first stop, placing the holder member on the opening with a second stop against the pane of glass with the glass disc in the opening, the first and second stops defining a plane to hold the glass disc precisely aligned with one surface of the pane of glass during the cementing of the glass disc.

* * * * *